United States Patent

Pascal et al.

(10) Patent No.: US 6,341,746 B1
(45) Date of Patent: Jan. 29, 2002

(54) DEVICE FOR ATTACHING AN AIRCRAFT ENGINE

(75) Inventors: Jule Pascal, Tournefeuille; Alain Porte, Colomiers; Stéphane Levert, Toulouse, all of (FR)

(73) Assignee: Aerospatiale Airbus

( * ) Notice: Subject to any disclaimer, the term of this patent is extended or adjusted under 35 U.S.C. 154(b) by 0 days.

(21) Appl. No.: 09/556,443

(22) Filed: Apr. 24, 2000

(30) Foreign Application Priority Data

May 17, 1999 (FR) .......................................... 99 06215

(51) Int. Cl.[7] .............................................. B64D 27/00
(52) U.S. Cl. ........................................................ 244/54
(58) Field of Search ........................... 244/54; 248/554, 248/555, 556; 60/39.31

(56) References Cited

U.S. PATENT DOCUMENTS

| | | | | |
|---|---|---|---|---|
| 5,078,342 A | * | 1/1992 | Langley et al. | |
| 5,275,357 A | | 1/1994 | Seelen et al. | |
| 5,320,307 A | * | 6/1994 | Spofford et al. | |
| 5,620,154 A | * | 4/1997 | Hey | |
| 5,649,417 A | * | 7/1997 | Hey | |
| 6,059,227 A | * | 5/2000 | Le Blaye et al. | |
| 6,173,919 B1 | * | 1/2001 | Le Blaye | |

FOREIGN PATENT DOCUMENTS

| | | |
|---|---|---|
| EP | 0564126 | 10/1993 |
| WO | WO93/11041 | 6/1993 |

* cited by examiner

Primary Examiner—Peter M. Poon
Assistant Examiner—Tien Dinh
(74) Attorney, Agent, or Firm—Burns Doane Swecker & Mathis LLP

(57) ABSTRACT

A particularly simple and compact attachment device to be interposed between an aircraft engine casing (C) and a strut connected to the wing or fuselage of an aircraft, is designed so as to only transmit forces exerted in a single direction (OZ). The device comprises a crossbar (18), articulated to an element (10) fixed to the strut and also fulfilling an emergency function. The ends of the crossbar (18) are connected to the engine casing (C) by rods (24). The element (10) is preferably formed from two parts (10a, 10b), each being able to transmit all the forces in the direction (OZ).

18 Claims, 1 Drawing Sheet

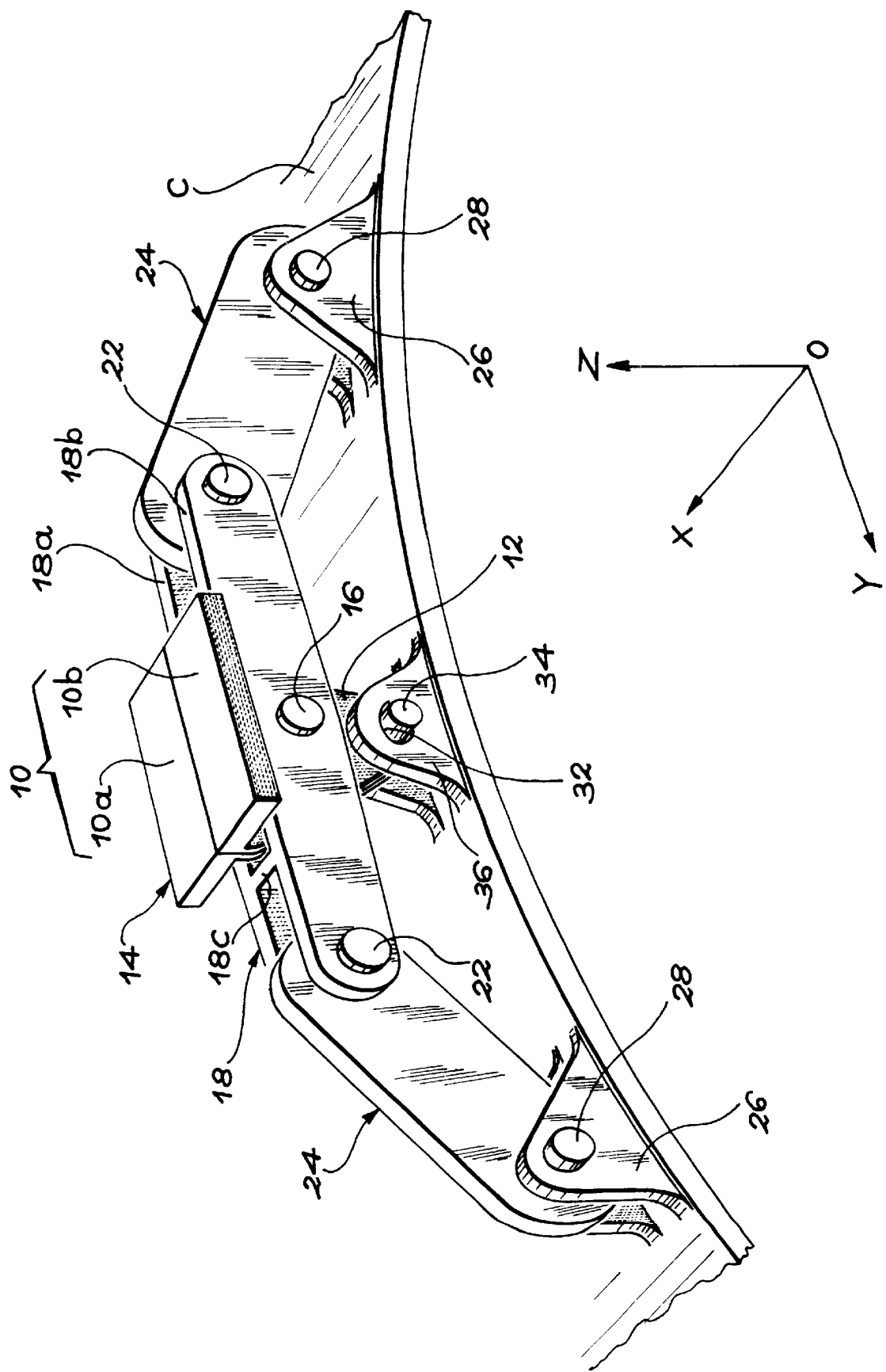

DEVICE FOR ATTACHING AN AIRCRAFT ENGINE

TECHNICAL FIELD

The invention relates to an attachment device for fixing an aircraft engine to a strut secured to a structural element of the aircraft, such as a fuselage or wing element.

The attachment device according to the invention can be used on any type of aircraft. A preferred application relates to aircraft of modern design, whose engines are equipped with very large diameter fans.

PRIOR ART

Engines equipping aircraft are either suspended to a strut fixed beneath the aircraft wing, or are laterally attached to a strut fixed to the aircraft fuselage. In both cases the link between the engine and the strut is generally provided by a front attachment device and a rear attachment device. The function of these attachment devices is to transmit to the aircraft, by means of the strut, the forces produced by the engine.

To analyze the forces transmitted by the attachment devices, to the engine is allocated an orthonormal fix OXYZ, in which the OX axis, which is directed forwards is oriented in accordance with the longitudinal axis of the engine, the OY axis is oriented laterally in a horizontal plane and the OZ axis is oriented vertically upwards.

With respect to said fix, in the case of an engine suspended on the wing, the forces transmitted to the aircraft structure by the attachment devices are mainly the thrust forces of the engine, essentially applied in accordance with the OX axis, lateral forces due more particularly to a gust of wind, applied substantially in accordance with the OY axis and forces due to the weight of the engine or generated in the case of the aircraft crashing and essentially applied in accordance with the OZ axis. Moreover, attachment devices transmit to the aircraft structure a moment along the OX axis and which is due to the rotary movement of the engine. In the case of an engine mounted laterally on the fuselage, the forces applied in accordance with the OY and OZ axes are reversed.

To ensure the fixing of a turbojet engine to an aircraft attachment strut, there are at present two main fixture types, namely the "core" type fixture and the "hybrid fan" type fixture.

In the core type fixture, the central casing of the turbojet engine is fixed directly to the aircraft strut by a front mount and a rear mount. In this case, the front mount simultaneously absorbs the forces along the OX, OY and OZ axes and the rear mount absorbs the forces along the OY and OZ axes, as well as the moment along the OX axis.

In the case of a hybrid fan-type fixture, a front mount is interposed between the strut and the turbojet engine fan casing and a rear mount is interposed between the strut and the central casing of the turbojet engine, as in the case of the core-type fixture. In this case, the front mount absorbs the forces along the OY and OZ axes and the rear mount absorbs the forces along the OX, OY and OZ axes, as well as the moment along the OX axis. Moreover and as is more particularly illustrated by EP-A-564 126, the absorption of the thrust along the OX axis takes place by means of two rods linking the rear mount to the front part of the central casing of the engine.

Thus, in all conventionally used aircraft engine fixing systems, all the attachment devices other than the thrust absorption rods ensure the transmission of forces in at least two different directions.

Moreover, the thrust absorption rods are dimensioned so as to take up a considerable force, oriented in accordance with the longitudinal axis OX of the engine. Thus, they are long rods (approximately 2 m).

In addition and as is more particularly illustrated by U.S. Pat. No. 5,275,357, the attachment devices used in existing fixing systems usually incorporate an emergency attachment structure. This emergency attachment structure, which is directly connected to the strut or an intermediate fitting, is a specific part solely stressed in the case of a fracture of one or more elements of the main attachment structure. At present, all the parts of emergency attachment structures are passive in normal operation. They do not intervene when the main attachment structure is operational. They only become active in the case of the fracture of one or more parts of the main attachment structure. Thus, their absence would not deteriorate the transmission of forces across the main attachment structure of the attachment device.

Recent use of engines having ever increasing sizes and weights accentuates the problems such as the bending of the engine, vibrations, etc. In order to obviate such problems whilst ensuring a better weight distribution, the replacement of conventional fixing systems by a new system using three instead of two attachment devices is being envisaged. In this case, the strut would be connected to the fan stator case by a front attachment device only taking up forces applied in a single direction substantially corresponding to the vertical axis OZ when the engine is placed beneath the aircraft wing.

In order to implement this attachment device, it is not possible to use the two rod structure serving to take up the thrust forces in the hybrid fan-type fixture. Thus, the direction of the force to be transmitted is located in a vertical and no longer a longitudinal plane. Moreover, the attachment device must be as narrow as possible, so that the disturbance produced in the aerodynamic air flow is as small as possible. The reduced space available between the strut and the fan stator case of the engine makes it necessary to use a compact attachment device.

The attachment device having to fulfil this function must preferably be easily dismantlable, in order to avoid any time loss during the installation or removal of the engine.

Finally, it is no longer possible to make use of one of the attachment devices used in conventional fixing systems, such as the front mount of the hybrid fan-type fixture, which takes up or absorbs the forces exerted in accordance with the OY and OZ axes. Thus, due to the fact that existing attachment devices always take up forces exerted in accordance with at least one direction other than the OZ axis, their use makes it necessary to more extensively stiffen the strut in order to ensure a correct absorption of the forces transmitted by the attachment device. This involves adding material and consequently making the strut heavier, which is prejudicial. It would also be contrary to improving the performance characteristics of the engine, sought by the use of a novel fixing system including a front attachment device only taking up forces mainly applied along the vertical OZ axis.

DESCRIPTION OF THE INVENTION

The invention mainly relates to a simplified attachment device usable in a novel fixing system for an aircraft engine to an attachment strut, in order to ensure the transmission of forces in a single direction, in a reduced space and causing minimum disturbance to the aerodynamic air flow.

In secondary manner, the invention also relates to an attachment device which, if necessary, can easily be dismantled.

According to the invention, this result is obtained by means of a device for attachment an aircraft engine to a strut fixed to a structural element of the aircraft, said device comprising a main attachment structure and an emergency attachment structure, characterized in that the main attachment structure ensures the transmission of forces oriented towards the strut, in a single direction, which is substantially radial with respect to a longitudinal axis of the engine, the emergency attachment structure incorporating an element fixed to the strut, which also forms part of the main attachment structure.

Bearing in mind the essential function fulfilled in the attachment device according to the invention, the element common to the main attachment structure and to the emergency attachment structure advantageously comprises at least two separate parts able to independently transmit the forces oriented in said direction. Thus, in the case of the fracture of one of the two parts, the forces are still transmitted through the other part.

In a preferred embodiment of the invention, the main attachment structure also comprises a crossbar articulated substantially in its centre to the element common to the main attachment structure and to the emergency attachment structure, and two rods articulated to each of the ends of the crossbar, so as to connect the latter to an engine casing.

In this arrangement, the crossbar is preferably articulated to the element common to the main attachment structure and to the emergency attachment structure by a hinge pin oriented substantially parallel to the longitudinal axis of the engine.

The rods are advantageously articulated to the crossbar and to the engine casing by swivel pins. This arrangement avoids parasitic forces, i.e. forces oriented in a direction different to the aforementioned force transmission direction, do not pass through the attachment device.

In order to complete the emergency attachment structure, the element common to said structure and to the main attachment structure is advantageously connected to the casing by a connection having a clearance and which does not work when the main attachment structure is operational.

Advantageously, the connection with clearance comprises another hinge pin, mounted on the element by means of a ball joint and a hole formed in a cap integral with the casing and traversed with clearance by said other hinge pin.

In the case where the engine is a turbojet engine, the attachment device according to the invention is advantageously used for connecting the strut to the fan stator case of said turbojet engine.

Preferably, the element common to the main attachment structure and to the emergency attachment structure comprises a disconnection plane for fixing to the strut by fixing means.

BRIEF DESCRIPTION OF THE DRAWING

A description will be given in non-limitative manner hereinafter of a preferred embodiment of the invention relative to the single drawing, which is a perspective view showing the attachment device according to the invention.

DETAILED DESCRIPTION OF A PREFERRED EMBODIMENT OF THE INVENTION

In the single drawing is shown an attachment device according to the invention, applied to the case of an engine installed beneath the wing of an aircraft. In a not shown constructional variant, a differently oriented, but identical attachment device can be used for fixing an engine laterally against the fuselage of an aircraft.

The attachment device shown in the drawing makes it possible to connect a casing C of the engine, which is to be attached to a not shown strut and which is fixed beneath the aircraft wing. More specifically, in the most frequent case where the aircraft engine is a turbojet engine, the attachment device according to the invention is advantageously interposed between the strut and the fan stator case C of said turbojet engine.

According to an essential feature of the invention, the attachment device illustrated in the drawing is a particularly simple and compact device, which is dimensioned and optimized so as to only transmit to the strut the forces exerted by the engine in a single direction oriented towards the strut and substantially radially with respect to a longitudinal axis of the engine.

Thus, the attachment device according to the invention only ensures the transmission to the strut of thrust forces directed substantially in accordance with the vertical axis OZ, in an orthonormal fix OXYZ in which the axis OX is oriented forwards in accordance with the longitudinal axis of the engine, the axis OY is oriented laterally and located in a horizontal plane and the axis OZ is oriented vertically upwards. In the not shown case where the attachment device is applied to the fixing of an engine to the fuselage of an aircraft, the only forces transmitted by said device are oriented substantially in accordance with the lateral axis OY.

Like the attachment devices used in conventional fixing systems of the core and hybrid fan types, the attachment device according to the invention comprises a main attachment structure normally ensuring the integral transmission of forces when operational, as well as an emergency attachment structure through which passes part of the forces to be transmitted, following the fracture of one of the parts of the main attachment structure.

In the attachment device according to the invention, the main attachment structure and the emergency attachment structure comprise a common element, designated by the reference 10 in the drawing.

Bearing in mind the vital function thereof in the attachment device, the element 10 is formed from two separate parts 10a and 10b, through which pass all the forces transmitted between the engine and the strut, both under normal conditions and under emergency conditions. More specifically, each of the parts 10a and 10b forming the element 10 is able to in itself transfer all these forces.

Each of the parts 10a and 10b has in cross-section in the vertical plane XOZ the shape of a L. The two parts 10a and 10b are coupled together back to back in such a way that the thus formed element 10 has in cross-section in the plane XOZ the shape of a T. Parts 10a, 10b are assembled with one another, e.g. using not shown bolts.

Thus, the element 10 comprises a male, vertical cap 12, formed half in each of the parts 10a, 10b, as well as a horizontal base plate 14, also half formed in each of the two parts constituting the element 10.

The planar, upper face of the base plate 14 of element 10 forms a disconnection plane to be fixed beneath the attachment strut suspended on the wing, by any appropriate fixing means such as barrel nuts or the like. To facilitate the understanding of the drawing, these fixing means are not shown.

The male cap 12 projects downwards from the base plate 14 in a plane perpendicular to the longitudinal axis OX of the engine. In the vicinity of the base plate 14, the cap 12 is traversed by a first, not shown hole, in which is fitted a hinge pin 16. Said hinge pin 16 is oriented substantially parallel to the longitudinal axis OX of the engine. It forms an integral part of the main attachment structure of the device, whose other constituent parts will now be described.

The main attachment structure of the attachment device according to the invention also comprises a crossbar 18, which is articulated substantially in its centre to the element 10 by means of the hinge pin 16. More specifically, the crossbar 18 extends in a direction substantially parallel to the lateral axis OY, on either side of the pin 16 and is fitted to said pin so as to be able to freely pivot with respect to the element 10.

The drawing shows that the crossbar 18 is in one piece and has two parallel branches 18a, 18b on either side of the male cap 12. These two branches 18a, 18b are connected to one another, on either side of the male cap 12, by members 18c, whereof only one is visible in the drawing. Beyond said members 18c, the branches 18a, 18b of the crossbar 18 form female caps, in which are received pivot pins 22 oriented parallel to the hinge pin 16.

As is also illustrated by the drawing, the main attachment structure also comprises two rods 24 connecting each of the ends of the crossbar 18 to the engine casing C. These rods 24 are located in the median plane of the crossbar 18 perpendicular to the longitudinal axis OX of the engine. More specifically, one end of each of the rods 24 is articulated in the female cap formed by the adjacent end of the crossbar 18, by means of the pin 22 and a not shown ball joint.

The other end of each of the rods 24 is articulated in a female cap 26 provided for this purpose on the engine casing C. This articulation is ensured by a pivot pin 28, as well as by a not shown ball joint interposed between the pin 28 and the end of the corresponding rod 24.

The emergency attachment structure is mainly constituted by the already described element 10. In order to ensure a direct mechanical connection between said element 10 and the engine casing C in the case of a failure of one of the parts constituting the main attachment structure, a second hole traverses the male cap 12 in the vicinity of its lower end. A pivot pin 34 is fitted in said second hole by means of a not shown ball joint. The pivot pin 34 traverses with clearance a hole 32 formed in a female cap 36 forming an integral part of the engine casing C. Like the pivot pins 16, 22 and 28, the pivot pin 34 is oriented substantially parallel to the longitudinal axis OX of the engine.

The clearance formed between the hole 32 and the pivot pin 34 is dimensioned in such a way that the female cap 36 is never in contact with the pivot pin 34 carried by the male cap 12, when the main attachment structure is operational. In order to absorb relative movements of the engine due more particularly to expansion, the hole 32 can optionally have an oblong shape in the circumferential direction.

When all the parts of the attachment device described hereinbefore are in an operating state and when the aircraft is on the ground, the assembly formed by the crossbar 18 and the rods 24 is naturally balanced, because the crossbar pivots freely about the pin 16. The forces exerted by the engine along the axis OZ pass through the rods 24, the crossbar 18, the pin 16 and then the element 10 up to the not shown strut. The element 10, which belongs to the emergency attachment structure, is consequently permanently active, i.e. in the absence of a fracture of a main attachment part.

When the aircraft is flying, the device is subject to thrust forces along the axis OX, to lateral forces along the axis OY and to forces due to the weight of the engine along axis OZ.

The thrust forces are largely absorbed by one or other, not shown attachment devices by which the engine is also connected to the strut. As the rods 24 are mounted on the crossbar 18 and on the casing C by swivel pins 22 and 28, even if a small proportion of the thrust forces along axis OX is not absorbed by another attachment device of the fixing system, it can in no case be transmitted by the attachment device according to the invention.

When the engine is exposed to a gust of wind along axis OY, it is automatically placed in a new balance position, as a result of a pivoting capacity of the crossbar 18 about the pin 16. This is made possible by the fact that the crossbar 18 is mounted in pivoting manner on the cap 12.

In the case of the fracture of one of the constituent parts of the attachment device, the cap 12 becomes active in the same way as the emergency attachment structure.

Thus, if one of the rods 24 breaks, the cap 12 automatically ensures the attachment and force passage function in association with the still complete other rod 24 and the crossbar 18. Thus, the forces are correctly retransmitted to the strut.

In the case of the fracture of one of the caps formed by the ends of the crossbar 18, the cap 12 ensures the same attachment and force passage function as previously, in association with the still whole part of the main attachment structure. The same applies if one of the pins 22 and 28 fractures.

The above description shows that the attachment device according to the invention is a compact device causing a minimum disturbance to the aerodynamic flow.

This device is also particularly simple, both in its design and in its implementation. In particular, all the parts are visible and can be inspected and dismantled without dismantling the engine. Moreover, the fitting and removal with respect to the strut are easy, due to not shown fixing means interposed between the base plate 14 of the element 10 and the strut.

Finally, the device is dimensioned and optimized so as to only absorb a single type of force and so as to ensure an emergency function in the case of a failure of a part.

The invention is obviously not limited to the embodiment described in exemplified manner hereinbefore. Thus, at least some of the male and female caps connecting the different parts of the device through pivot pins can be reversed without passing beyond the scope of the invention. In this case, the element 10 can in particular be formed by the assembly of two parts having a U-shaped cross-section embedded in one another.

The element 10 can also be in a single piece dimensioned for this purpose. Moreover, although the device is advantageously positioned between a strut and a fan stator case of the turbojet engine, it can also be used for connecting a strut to any other aircraft engine casing. Finally, as has already been stated, such a device can also be used in the case of an engine fixed laterally to an aircraft fuselage.

What is claimed is:

1. A device for attaching an aircraft engine to a strut fixed to a structural element of the aircraft, said device comprising:

an emergency attachment structure, the emergency attachment structure including an emergency attachment element fixed to the strut, the emergency attachment element being formed of at least two separate parts wherein the two separate parts are aligned through a plane passing through a pivot pin, wherein the pivot pin couples the emergency attachment element to a receiving structure disposed upon the aircraft engine; and a main attachment structure, wherein the main attachment structure transmits forces orientated towards the strut substantially in a single direction, the single direction being substantially radial with respect to the longitudinal axis of the engine, the main attachment structure attached to the emergency attachment element.

2. The device according to claim 1, wherein the two separate parts able to independently transmit the forces orientated in said direction.

3. A device for attaching an aircraft engine to a strut, the strut fixed to a structural element of an aircraft, the device comprising:

an emergency attachment structure, the emergency attachment structure includes an emergency attachment element fixed to the strut; and a main attachment structure, wherein the main attachment structure ensures transmission of forces orientated towards the strut in a single direction, the direction being substantially radial with respect to the longitudinal axis of the engine, wherein the main attachment structure further includes a crossbar articulated substantially in its center to said emergency attachment element, as well as two rods articulated at a first end to each of the ends of the crossbar and articulated at a second end so as to connect the rods to an engine casing.

4. The device according to claim 3, wherein the crossbar is articulated to said emergency attachment element by a hinge pin orientated substantially parallel to the longitudinal axis of the engine.

5. The device according to claim 3, wherein the rods are articulated to the crossbar and to the engine casing by swivel pins.

6. The device according to claim 3, wherein said emergency attachment element is connected to the engine casing by a connection with clearance, not working when the main attachment structure is operational.

7. The device according to claim 6, wherein said connection with clearance comprises a second hinge pin, mounted on the emergency attachment element by means of a ball joint, and a hole formed in a cap integral with the engine casing and traversed with clearance by said second hinge pin.

8. The device according to claim 3, wherein, with said engine being a turbojet engine, said engine casing is a fan stator case of the turbojet engine.

9. The device according to claim 3, wherein said emergency attachment element comprises a disconnection plane to be fixed to the strut by fixing means.

10. The device according to claim 3, wherein said emergency attachment element comprises at least two separate parts able to independently transmit the forces orientated in said direction.

11. The device according to claim 1, wherein the main attachment structure further including a crossbar rotatably attached substantially in its center to the emergency attachment element, the crossbar farther including two rods articulated to each of the ends of the crossbar, wherein the other ends of the rods are articulated to an engine casing.

12. The device according to claim 11, wherein the crossbar is articulated to said emergency attachment element by a hinge pin orientated substantially parallel to the longitudinal axis of the engine.

13. The device according to claim 12, wherein the rods are articulated to the crossbar and to the engine casing by swivel pins.

14. The device according to claim 13, wherein said emergency attachment element is connected to the engine casing by a connection with clearance, not working when the main attachment structure is operational.

15. The device according to claim 14, wherein said connection with clearance comprises a second hinge pin, mounted on the emergency attachment element by means of a ball joint, and a hole formed in a cap integral with the engine casing and traversed with clearance by said second hinge pin.

16. The device according to claim 15, wherein, with said engine being a turbojet engine, said engine casing is a fan stator case of the turbojet engine.

17. The device according to claim 16, wherein said emergency attachment element comprises a disconnection plane to be fixed to the strut by fixing means.

18. The device according to claim 17, wherein said emergency attachment element comprises at least two separate parts able to independently transmit the forces orientated in said direction.

* * * * *